US010266075B2

(12) United States Patent
Dlugokecki et al.

(10) Patent No.: US 10,266,075 B2
(45) Date of Patent: Apr. 23, 2019

(54) STOWABLE VEHICLE SEAT WITH SLOTTED GUIDE LINKAGE

(71) Applicant: LEAR CORPORATION, Southfield, MI (US)

(72) Inventors: Andrzej Dlugokecki, Mountain View, CA (US); Kyle Calvert, Sterling Heights, MI (US); Mark Allyn Folkert, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 257 days.

(21) Appl. No.: 15/192,482

(22) Filed: Jun. 24, 2016

(65) Prior Publication Data
US 2017/0001543 A1 Jan. 5, 2017

Related U.S. Application Data

(60) Provisional application No. 62/239,294, filed on Oct. 9, 2015, provisional application No. 62/188,123, filed on Jul. 2, 2015.

(51) Int. Cl.
*B60N 2/20* (2006.01)
*B60N 2/30* (2006.01)
*B60N 2/10* (2006.01)

(52) U.S. Cl.
CPC ............... *B60N 2/206* (2013.01); *B60N 2/10* (2013.01); *B60N 2/309* (2013.01); *B60N 2/3031* (2013.01); *B60N 2/3065* (2013.01); *B60N 2/3072* (2013.01); *B60N 2/3093* (2013.01)

(58) Field of Classification Search
CPC ........ B60N 2/3072; B60N 2/10; B60N 2/206; B60N 2/3031; B60N 2/3065; B60N 2/309

USPC ................... 297/378.1, 318, 341; 296/65.09
See application file for complete search history.

(56) References Cited

U.S. PATENT DOCUMENTS

| | | | |
|---|---|---|---|
| 6,012,755 A | 1/2000 | Hecht et al. | |
| 6,270,141 B2* | 8/2001 | Moon | B60N 2/206 |
| | | | 296/65.08 |
| 6,578,919 B2 | 6/2003 | Seibold et al. | |
| 7,040,704 B2* | 5/2006 | Epaud | B60N 2/3013 |
| | | | 297/378.1 |
| 7,255,399 B2 | 8/2007 | White et al. | |
| 7,267,406 B2 | 9/2007 | Sturt | |
| 7,328,929 B2 | 2/2008 | Epaud | |

(Continued)

FOREIGN PATENT DOCUMENTS

CN 101365607 A 2/2009
DE 102005003603 A1 7/2006

OTHER PUBLICATIONS

The State Intellectual Property Office of People's Republic of China, First Office Action for Application No. 201610511701.0 dated Jun. 4, 2018, 15 pages (including English language translation).

*Primary Examiner* — Milton Nelson, Jr.
(74) *Attorney, Agent, or Firm* — Brooks Kushman P.C.

(57) ABSTRACT

A foldable vehicle seat includes a seat base, a seatback connected to the seat base for pivotal movement relative to the seat base from a generally vertical use position to a generally horizontal stow position atop the seat base, wherein the seat base is pivotally connected to the floor such that, when the seatback is moved from its use position to the folded, stow position, the seat base may be moved forward and downward to thereby provide a lower load floor position.

10 Claims, 4 Drawing Sheets

(56) References Cited

U.S. PATENT DOCUMENTS

| | | | | |
|---|---|---|---|---|
| 8,066,326 B2 * | 11/2011 | Hurst, III | ............. | B60N 2/3031 |
| | | | | 297/321 |
| 8,474,910 B2 * | 7/2013 | Kammerer | ............... | B60N 2/12 |
| | | | | 296/65.09 |
| 2004/0256901 A1 * | 12/2004 | Nakaya | .................... | B60N 2/06 |
| | | | | 297/378.1 |
| 2009/0152888 A1 * | 6/2009 | Zelmanov | .............. | B60N 2/206 |
| | | | | 296/65.09 |

* cited by examiner

STOWABLE VEHICLE SEAT WITH SLOTTED GUIDE LINKAGE

CROSS-REFERENCE TO RELATED APPLICATIONS

This application claims the benefit of U.S. provisional application Ser. No. 62/188,123 filed Jul. 2, 2015 and 62/239,294 filed Oct. 9, 2015, the disclosures of which are hereby incorporated in their entirety by reference herein.

TECHNICAL FIELD

The present invention relates to a vehicle seat that is adjustable from a use position to a folded ("stow") position.

BACKGROUND

Sport-utility vehicles, minivans, and other crossover vehicle designs often include second or third row seats which may be adjustable from a seating position for accommodating passengers to a stow position to provide cargo space.

It is often desirable to provide a relatively low load floor height to minimize the lift height of objects loaded into vehicles. It is also often desirable to maximize potential vehicle cargo volumes. A further vehicle design objective also often includes minimizing or eliminating angled and or multi-leveled load floors that might result from folding auxiliary seats to their stow positions.

Existing auxiliary row seats often include articulating mechanisms which re-position the seat cushion and associated support frame (together, "the seat base"), such as, for example, by moving the seat base forward and/or tipping the forward end of the seat base downward, to allow the seatback to achieve a more flattened and/or lower position when the seatback is folded forward over the seat base. However, undulating vehicle floors, particularly in rearward seats located over the rear wheels, often limit the space under the seat and present a positioning challenge for meeting load floor design objectives for folding seats.

SUMMARY

According to one aspect of the present disclosure, a vehicle seat is disclosed that has a seat base that may be shifted between a raised, use position and a lowered position, and a seatback attached to the seat base and foldable from a generally vertical use position to a folded-forward stow position in which the seatback is generally parallel and atop the seat base. In each of the disclosed embodiments, the seat base is slidably and pivotally connected to the floor of the vehicle by virtue of a riser assembly that includes at least one rear drive link, connected at its upper end to the seatback for pivotal rotation with respect to the seatback as the seatback is folded forward and downward, and pivotally connected at its lower end to the seat base, and a front link which is pivotally connected at its upper end to the front portion of the seat base, and pivotally at its lower end to the vehicle floor.

In one embodiment, the lower end of the rear drive link is also slidably mounted in a guide slot in the vehicle floor such that, when the seatback is moved from its use position to the folded, stow position, the seat base is guided forward and downward along the surface of the vehicle floor into the occupant's footwell, to thereby provide additional clearance for the folding seatback, resulting in a lower load floor position.

In a second disclosed embodiment, the rear drive link is pivotally connected to the seat back at its rearward end and pivotally connected to a front link at its forward end, such that, as the seat back is folded forward and downward, the drive link rotates the front link about its lower pivot to thereby drive the seat base forward and downward. The rear drive link is also mounted in a guide slot to the side of the seat base frame to guide the motion of the seat base frame as the seat back and the seat base frame are pivoted from their use to their stow positions.

The seat base frame may also include a structural cross member which interconnects opposite side members of the seat base frame at the rear portion of the seat base frame, and at least one support bracket mounted directly or indirectly to the vehicle floor and including a lateral guide slot which receives and secures the rear cross member of the seat base within the support bracket whenever the seat base is positioned rearward and upward into its use position.

These and other aspects of the disclosure will be more fully explained with reference to the attached drawings and the following detailed description.

DETAILED DESCRIPTION

Figure 1:
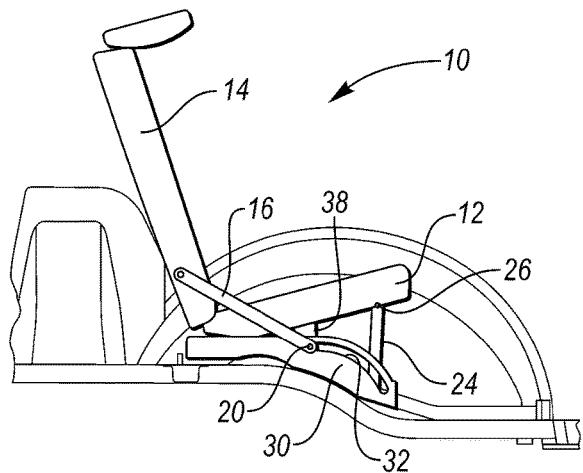
FIG. 1 is a side view of one embodiment of the foldable vehicle seat in its use position.
Figure 2:
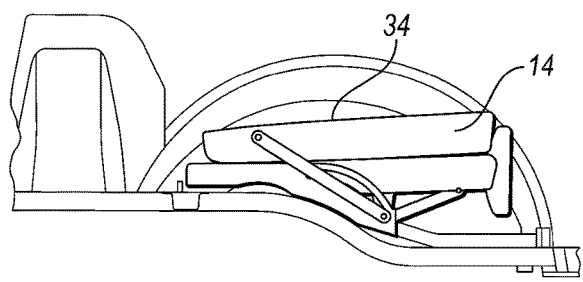
FIG. 2 is a side view of the seat of FIG. 1 folded into the stow position.
Figure 3:
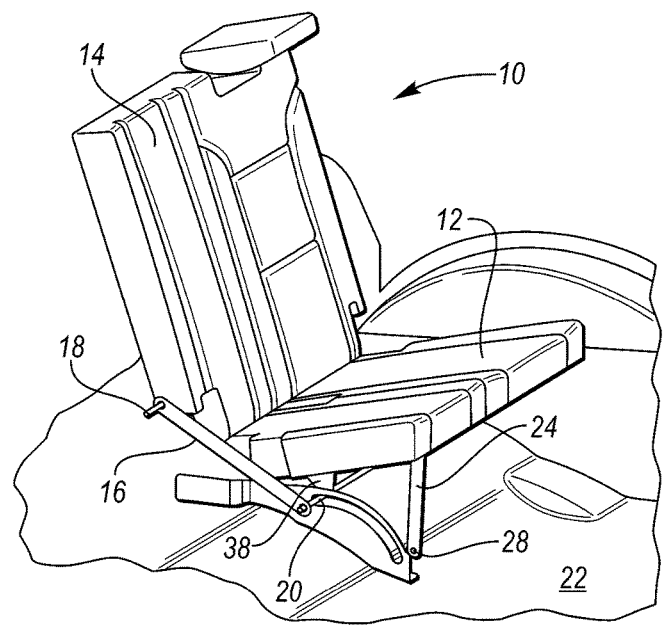
FIG. 3 is a front right perspective view of the seat of FIG. 1.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-10, in each of the disclosed embodiments (shown, respectively, in FIGS. 1-5 and FIGS. 6-10) the disclosed seat, generally designated as 10, 100 includes a seat base 12, 112 and a seatback 14, 114 mounted for pivotal rotation relative to the seat base 12, 122. The seat base 12, 112 and seatback 14, 114 may each include a rigid frame, and one or more foam cushions, for aesthetics and for the comfort of seated occupants. The seat base 12, 112 and seatback 14, 114 may also be upholstered with leather, fabric, or other desired materials. The seat 10, 100 may be configured as a bench-type or as a bucket-type seat, and may be sized to accommodate one or more occupants.

In a first disclosed embodiment, shown in FIGS. 1-5, the seatback 14 may be pivotally connected to the seat base 12 by one or more rear drive links 16, each of which is connected to the seatback 14 by upper pivot pin 18, and to the seat base 12 by lower pivot pin 20. Lower pivot pin 20 may be connected to the seat base frame at the side of, or underneath the seat base 12, such as by bracket 38. Seat base 12 is also pivotally connected to the vehicle floor 22 via one or more front links 24, each of which is pivotally connected to the seat base 12 at its upper end by upper pivot pin 26, and pivotally connected at its lower end to the vehicle floor 22 at its lower end by lower pivot pin 28.

Rear drive link 16 is also slidably connected to the vehicle floor 22 via one or more guide brackets 30. Guide bracket 30 includes a guideway, which may be in the form of slot 32, which slot 32 is shaped to facilitate the desired movement path of seat base 12 as seatback 14 is folded downward thereby moving seat base 12 forward and downward as the seatback 14 is rotated forward into a generally flattened stow position. In this disclosed embodiment, lower pivot pin 20 extends through slot 32 of the guideway bracket 30 to direct the motion of the seat base 12 as the seatback 14 is folded forward.

The seatback 14 may be connected to the seat base 12 using a single rear drive link 16, as shown in the figures, or it may employ multiple rear drive links, such as, for example one each on either side of the seat 10. Where more than one rear drive link is employed, each of the drive links 16 may be mounted to the seat base frame at the same location, for example, via a common lower pivot pin 20, or at multiple locations on the seat base 12, using multiple pivot pins. Similarly, in embodiments that employ multiple rear drive links 16, each of the rear drive links 16 could be connected to a single guide bracket 30, or, alternatively, to multiple guide brackets, to facilitate the guided movement of the seat base 12 as the seat 10 is folded.

Similarly, seat base 12 may be pivotally connected to the vehicle floor 22 via a single front link 24, as shown in the figures, or, alternatively, multiple front links may be employed, such as, for example, a pair of front links, one attached on each side of the seat base 12.

Figure 6:
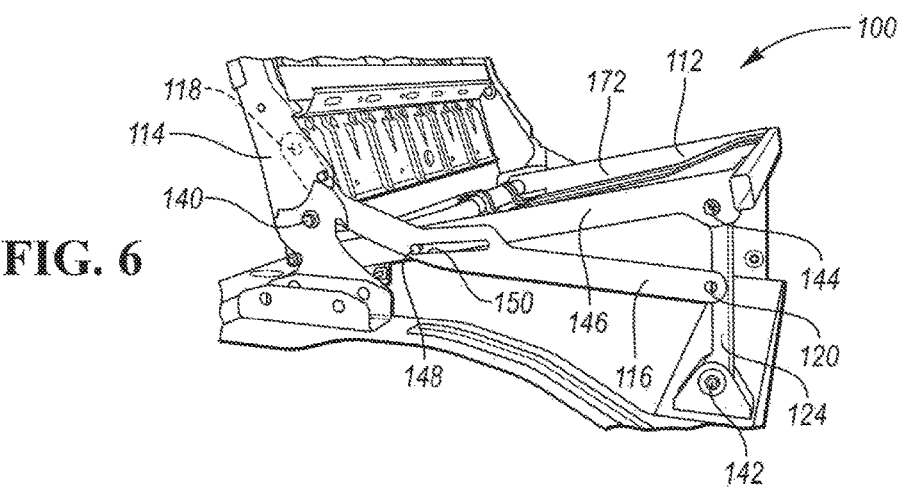
FIG. 6 is a partial side perspective view of another embodiment of the foldable vehicle seat in its use position.
Figure 7:
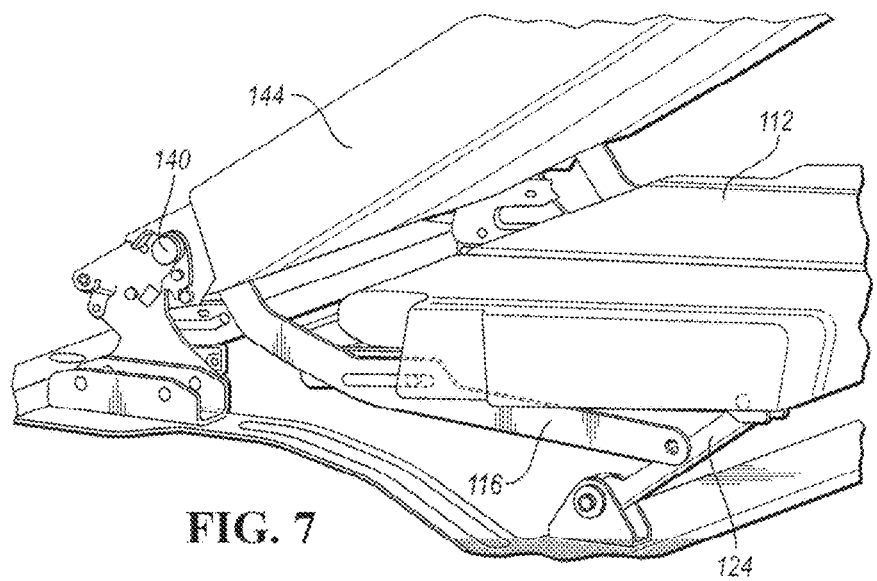
FIG. 7 is a partial side perspective view of the seat of FIG. 6 as it is being folded/unfolded between its use and stow positions.
Figure 8:
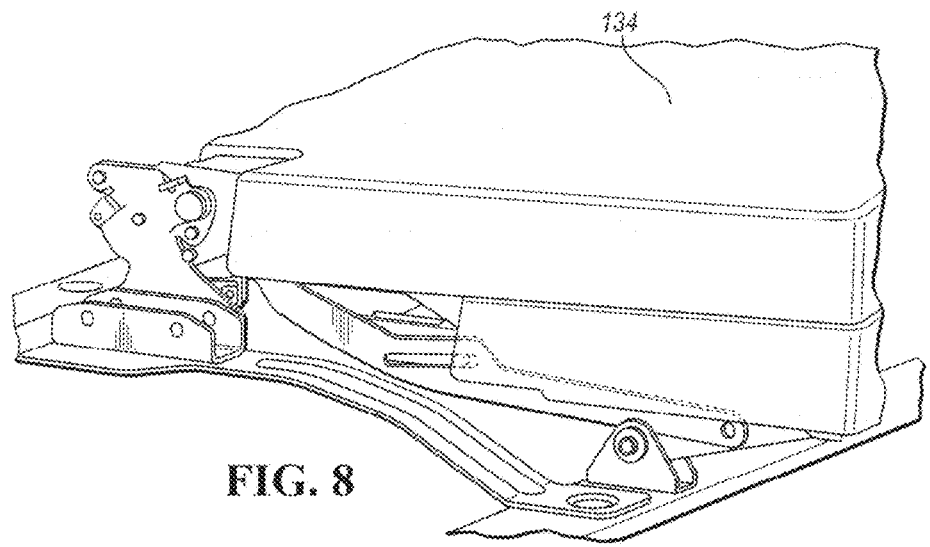
FIG. 8 is a side perspective view of the seat of FIG. 6 in its stow position.

Referring now to FIGS. 6-8 a second embodiment of the seat 100 is disclosed which utilizes an alternate drive link arrangement. In this disclosed embodiment, at least one drive link 116 is employed to interconnect the seat back 114 with the seat base 112 to transmit the folding/unfolding forces applied to the seat back 114 to the seat base 112 to simultaneously position the seat base to and from its use and stow positions as the seat back is positioned from its use and stow positions. In this embodiment, the rear drive link 116 is pivotally connected to the seat back 114 such as by pivot 118 at its rearward end, and pivotally connected to one of the front links 124, such as by pivot 120, so that when a rotational force is applied to the seat back 114 to, for example, pivot the seat back about pivot 140 from its use to its stow position, the rear drive link 116 applies that force to front link 124, thereby rotating front link 124 about its lower pivot 142 to rotate front link 124 clockwise (as viewed in FIG. 6) thereby causing the seat base 112 to move about upper pivot 144 in a forward and downward direction toward its stow position. Rear drive link 116 may also be slidably connected to a side portion 146 of the seat base frame 112, such as by journaling a guide pin 148 connected to the side portion 146 of the frame within a guide slot 150 provided in the rear drive link 116. It should be appreciated that the link and orientation of the guide slot 150 on rear drive link 116 may be varied to provide the desired guiding motion of the rear portion of the seat base 112 as it is driven by rear drive link 116 to and from its use and stow positions.

Figure 9:
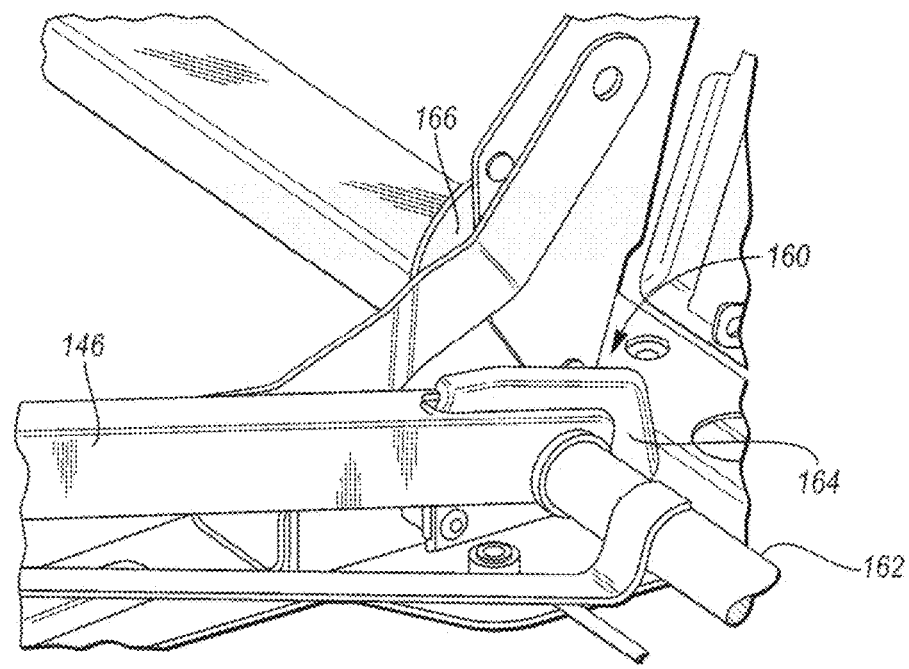
FIG. 9 is a partial side perspective view of the rear portion of the seat base and seat back of the seat of FIG. 6 showing the rear seat frame cross member received within and supported by the rear seat base frame support bracket.
Figure 10:
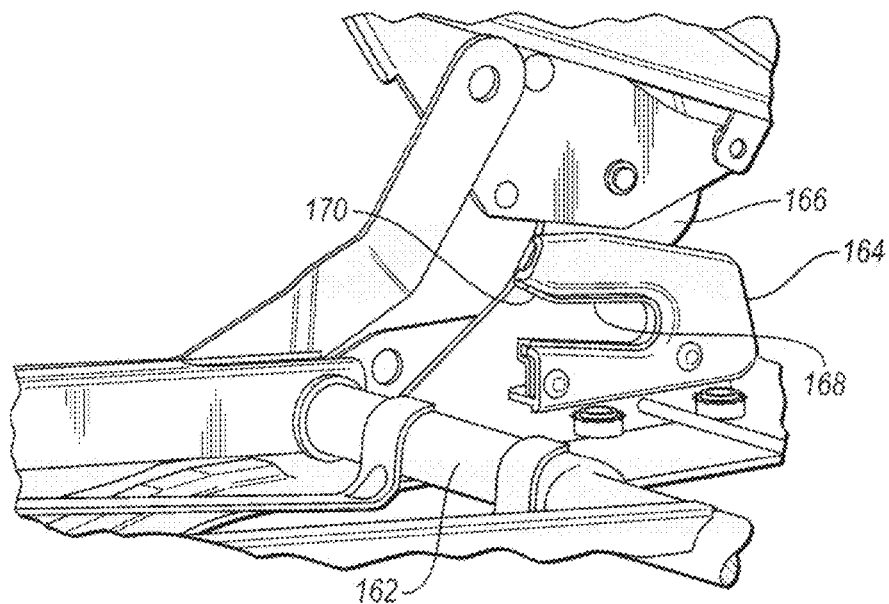
FIG. 10 is a partial side perspective view of the seat of FIG. 10 showing the rear seat base frame cross member disengaged from the rear seat base support bracket as the seat base frame is moved to its stow position.

Referring now to FIGS. 9-10, the seat 10, 100 may include a seat base 112 structural support 160 which supports the rear portion of the seat base frame 112 when the seat base frame 112 is in its use position. Seat base support 160 may include a structural cross member, such as tube 162 seat frame side members 146 and 172 structurally define the rear portion of the seat base 112 and a support bracket 164, mounted directly or indirectly on the floor of the vehicle, such as for example, on seat back support bracket 164. Support bracket 164 may include a guide slot 168 which is suitably sized and positioned to receive side member 146 and/or cross member 162 as seat base 112 is moved rearward into its use position. Once nested into the support bracket 164, any load applied to the seat base 112 will be transferred by side member 146 and/or cross member 162 to support bracket 164 to provide additional structural support for the seat base 112 when it is in its use position. It should be appreciated that the guide slot 168 may be open at its forward end to receive cross member 162 as it is moved rearward into its use position. It should also be appreciated that guide slot 168 may be of sufficient size such that side member 146 and/or cross member 162 fits snuggly within guide slot 168 when the side member 146 and/or cross member is engaged within the support bracket 164. A plastic bushing 170 may be provided to ensure a tight fit and prevent any rattling of the seat components as they are engaged and disengaged.

It should be appreciated that, in the disclosed embodiment, when the seat 100 is folded from its use to its stow position, seat base 112 moves forward and exits the forward opening in the guide slot 168, such that when the seat 10, 100 is in its stow position the rear portion of the seat base 112 is supported by rear seat frame guide pin 148 within guide slot 150 on the rear drive link 116. However, since the seat is not carrying an occupant in the load position, the pin/guide slot support is adequate to support the load of the rear portion of the seat base frame 112 when the seat is in its stow position.

Referring again to FIGS. 2 and 8, it will be appreciated that the disclosed embodiments of seat 10, 100 provide the capability to fold the seat from its use position to a stow position in which the rear face 34, 134 of the seatback 14, 114 provides a low profile load floor. When provided as a third row seat along with a folding second row seat, such as the type best shown and described in Applicant's co-pending U.S. application Ser. No. 15/192,362, for a "VEHICLE SEAT WITH FOLDABLE STOW POSITION", the disclosed seat may be folded to form a nearly flat load floor that is co-planar with the load platform formed by the folded second row seat.

The kinematic sequence associated with folding the seats of each of the disclosed embodiments 10, 100 from its use position to its stow position will now be described with particular reference to FIGS. 1,4,5, and 2 (with respect to seat 10), and FIGS. 6-8 (with respect to seat 100). FIGS. 1 and 6 illustrate, respectively, seats 10, 100 in a typical use position. In use, the seatback may be locked, such as at upper pivot 18, 118 to prevent movement of the seatback 14, 114 or the seat base 12, 112.

Figure 4:
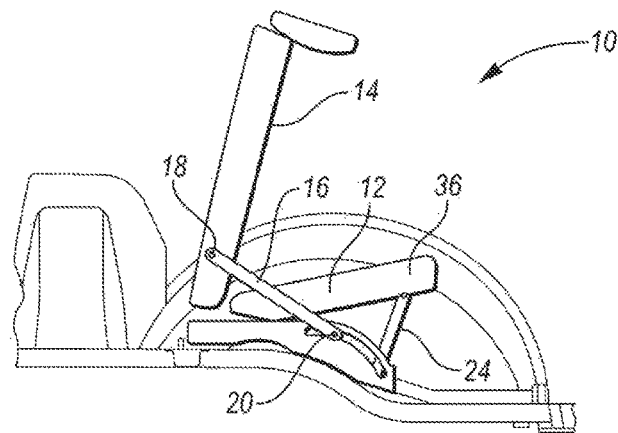
FIG. 4 is a side view of the seat of FIG. 1, showing the seatback in its initial stages of pivoting forward and the seat base sliding forward and pivoting downward.
Figure 5:
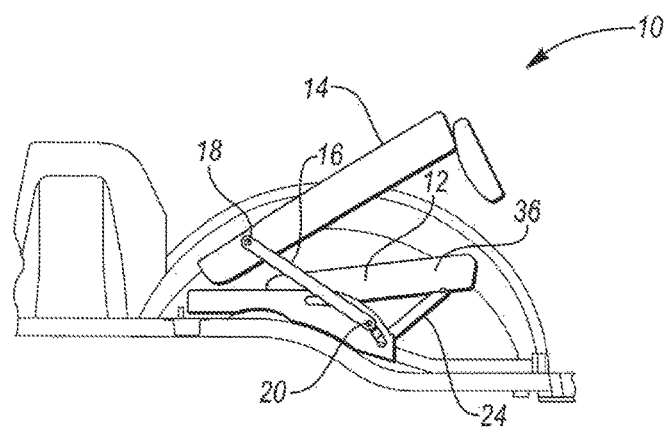
FIG. 5 is a side view of the seat of FIG. 1 showing the further progressive movement of the seatback and seat base in the kinematic sequence of folding from its use to its stow position.

When it is desired to fold the seat from its use position to its stow position, a first actuation (by operation of a lever, pushbutton, or other actuating device) of the seatback 14, 114 causes the seatback to unlock at the upper pivot 18, 118, thereby allowing the seatback to begin to fold forward (either by manual operation, spring-assist, and/or motor-powered assist) onto the seat base 12, 112, as shown in FIGS. 4 and 7.

In the embodiment of FIG. 1, the motion of the seatback folding forward moves the rear drive link 16 and, thus, seat base 12 forward and downward as the lower pivot 20 moves within the guideway.

In the embodiment of FIG. 6, the motion of the seat back folding forward moves rear drive link 116 and, thus, seat base 112 forward and downward as the front pivot 120 of the rear drive link 116 drives front link 124 to pivot about its base pivot 142, thereby pivoting the seat base frame 112 about pivot 144 to move the seat base 112 forward and downward to its stow position. As previously described, the rear position of the seat base 112 is guided during this motion by the slidable movement of guide pin 148 within guide slot 150 on rear guide link 116.

In each of the disclosed embodiments, the front portion 36, 136 of the seat base 12, 112 begins moving forward and downward as front link 24, 124 rotates clockwise (when viewed from the perspective shown in the figures) about lower pivot 28, 128.

As each of the disclosed embodiments of the seat 10, 100 progresses through the folding sequence (as shown, respectively, in FIGS. 1,4,5, and 3, and FIGS. 6-8), seat base 12, 112 is guided forward and downward into the footwell space, thereby allowing folding seatback 14, 114 two obtain a lower, more nearly horizontal orientation in the collapsed stow position. It will be appreciated that rear drive link 16, 116 and guide slot 32, 132 may be configured in various sizes and shapes to facilitate the desired movement of the seatback 14, 114 and seat base 12, 112 to achieve the desired load floor height and inclination, depending upon the particular vehicle interior space constraints and load floor topography. It will also be appreciated that, as shown in the disclosed embodiment, the disclosed folding seat structure can attain a relatively low load floor height and relatively horizontal load floor inclination when seat 10, 100 is folded into the stow position.

The sequence for restoring the seat to its use position is generally reversed from the above-described sequence, except that, whether implemented by manual or powered actuation, the lock(s) which secure(s) the seat in its use position should be automatically engaged when the seatback reaches its upright position.

When the seat 10, 100 is in a first (e.g., the stow) position, the mass of the seat may be balanced with one or more spring elements (not shown) fixed to one moveable components, such as, for example, one of the forward links 24, 124 to minimize the lifting effort required to raise the seatback 14, 114 and seat base 12, 112.

Each of the disclosed embodiments may also employ any of a variety of conventional lock mechanisms (e.g., cam/pawl/sector, hook and pin, or shear pin types) which may be engaged to lock, for example, one or more of the front links 24, 124 in place, such as, for example, to thereby lock the seat in its use position. The lock mechanism may then be disengaged, as and when desired, to facilitate movement of the seat to, for example, its stow position.

Seat 10, 100 may also, or alternatively, be outfitted with known manual or powered actuators (not shown) which may be operated to unlock and move the seatback and seat base from their use to stowage positions. The release mechanisms themselves may be manual, such as, for example, conventional release cables activated by pull latches. Alternatively, the release/actuating mechanisms may themselves be powered, with manual (or spring-assisted) repositioning of the seat components required after powered release. Alternatively, or additionally, actuation and repositioning of the seat components may be partially or fully powered such that, for example, the seat folds from its use position to the stow position with the push of a button.

One example of a powered stowable vehicle seat is disclosed in pending U.S. application Ser. No. 14/707,256, for "POWERED STOWABLE VEHICLE SEAT AND ASSOCIATED SEAT FRAME ASSEMBLY", filed May 8, 2015, the disclosure of which is hereby incorporated by reference herein to the extent that such power/drive designs may be integrated to provide power-assist to position the embodiments of the seat 10, 100 disclosed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A foldable vehicle seat including:
   a seat base;
   a seatback having a lower end pivotally connected to a location fixed with respect to the vehicle floor for movement from at least one generally vertical use position to a generally horizontal stow position atop the seat base;
   at least one front link having an upper end and a lower end, which front link is pivotally connected at its upper end to the seat base, and pivotally connected at its lower end to the vehicle floor;
   at least one rear drive link having a first end and a second end, which rear drive link is pivotally connected at its first end to the seatback, and pivotally connected at its second end to one of the at least one front links, the rear drive link including a guide slot, wherein the seat base is operatively connected within the guide slot; and
   wherein forward movement of the seatback causes the seatback to rotate relative to the first end of the rear drive link and move the rear drive link forward, and wherein movement of the rear drive link moves the front link and the seat base forward, causing the front link to pivot such that, when the seatback is moved from its use position to the stow position, the seat base is moved forward and downward to thereby provide a lower load floor position.

2. The foldable vehicle seat of claim 1 further including at least one seatback support bracket mounted on the vehicle floor, and wherein the seatback is pivotally connected to the seatback support bracket.

3. The foldable vehicle seat of claim 1 wherein the seat base includes a structural support which supports the rear portion of the seat base, and further including a support bracket mounted at a location fixed with respect to the vehicle floor, the support bracket including a guide slot suitably sized and positioned to receive and support the structural support within the guide slot when the seat base is in the use position.

4. The foldable vehicle seat of claim 1 wherein the at least one front link includes a pair of front links, each front link being connected at its upper end to opposite sides of the seat base.

5. The foldable vehicle seat of claim 1 wherein the at least one rear drive link includes a pair of rear drive links, each rear drive link being pivotally connected at its first end to opposite sides of the seatback.

6. The foldable vehicle seat of claim 1 wherein:
the at least one front link includes a pair of front links, each front link being connected at its upper end to opposite sides of the seat base; and
the at least one rear drive link includes a pair of rear drive links, each rear drive link being pivotally connected at its first end to opposite sides of the seatback.

7. A foldable vehicle seat including:
a seat base;
a seatback having a lower end pivotally connected to a location fixed with respect to the vehicle floor for movement from at least one generally vertical use position to a generally horizontal stow position atop the seat base;
at least one front link having an upper end and a lower end, which front link is pivotally connected at its upper end to the seat base, and pivotally connected at its lower end to the vehicle floor;
at least one rear drive link having a first end and a second end, which rear drive link is pivotally connected at its first end to the seatback, and pivotally connected at its second end to one of the at least one front links, the rear drive link including a guide slot, wherein the seat base is operatively connected within the guide slot;
a structural support which supports the rear portion of the seat base;
a support bracket mounted at a location fixed with respect to the vehicle floor, the support bracket including a guide slot suitably sized and positioned to receive and support the structural support within the guide slot when the seat base is in the use position; and
wherein forward movement of the seatback causes the seatback to rotate relative to the first end of the rear drive link and move the rear drive link forward, and wherein movement of the rear drive link moves the front link and the seat base forward, causing the front link to pivot such that, when the seatback is moved from its use position to the stow position, the seat base is moved forward and downward to thereby provide a lower load floor position.

8. The foldable vehicle seat of claim 7 wherein the at least one front link includes a pair of front links, each front link being connected at its upper end to opposite sides of the seat base.

9. The foldable vehicle seat of claim 7 wherein the at least one rear drive link includes a pair of rear drive links, each rear drive link being pivotally connected at its first end to opposite sides of the seatback.

10. The foldable vehicle seat of claim 7 wherein:
the at least one front link includes a pair of front links, each front link being connected at its upper end to opposite sides of the seat base; and
the at least one rear drive link includes a pair of rear drive links, each rear drive link being pivotally connected at its first end to opposite sides of the seatback.

\* \* \* \* \*